United States Patent [19]

Arai et al.

[11] 4,367,257
[45] Jan. 4, 1983

[54] THIN MAGNETIC RECORDING MEDIUM

[75] Inventors: Yoshihiro Arai; Makoto Nagao; Akira Nahara, all of Odawara, Japan

[73] Assignee: Fuji Photo Film Co., Ltd., Kanagawa, Japan

[21] Appl. No.: 254,687

[22] Filed: Apr. 16, 1981

[30] Foreign Application Priority Data

Apr. 16, 1980 [JP] Japan .................................. 55/50201
Apr. 16, 1980 [JP] Japan .................................. 55/50202

[51] Int. Cl.$^3$ .............................................. G11B 5/64
[52] U.S. Cl. ................................ 428/220; 204/192 M; 365/122; 252/62.55; 427/132; 428/336; 428/692; 428/693; 428/400
[58] Field of Search ............... 428/692, 694, 695, 900, 428/693, 220, 336; 427/131, 128, 250, 132; 252/625.5; 204/192 M; 365/33, 34, 122

[56] References Cited

U.S. PATENT DOCUMENTS

| | | | |
|---|---|---|---|
| 3,342,591 | 9/1967 | Gambino et al. | 252/62.55 |
| 4,210,946 | 7/1980 | Iwasahi et al. | 427/131 |
| 4,277,809 | 7/1981 | Fisher | 427/131 |
| 4,293,621 | 10/1981 | Toyami | 428/694 |

FOREIGN PATENT DOCUMENTS

| | | | |
|---|---|---|---|
| 54-38135 | 3/1979 | Japan | 428/900 |
| 54-121719 | 9/1979 | Japan | 252/62.55 |

OTHER PUBLICATIONS

Mimura et al., Magnetic Properties of Amorphous Tb-Fe Thin Films Prepared by RF Sputtering, Applied Physics Letters, vol. 28, No. 12, 6/15/76, pp. 746-748.
Berry et al., Obtaining a Hard Magnetic Array in a Magnetically Soft Matrix, IBM Tech. Disc. Bulletin, vol. 16, No. 4, 9/1973, pp. 191-192.

Primary Examiner—Stanley S. Silverman
Attorney, Agent, or Firm—Sughrue, Mion, Zinn, Macpeak & Seas

[57] ABSTRACT

A magnetic recording medium having a thin magnetic amorphous rare earth metal-transition metal alloy film is disclosed, the amorphous alloy film having an axis of easy magnetization in a direction substantially vertical to the film surface and containing a crystalline phase in the amorphous phase. The magnetic recording medium exhibits high coercive force over a wide compositional range.

6 Claims, 1 Drawing Figure

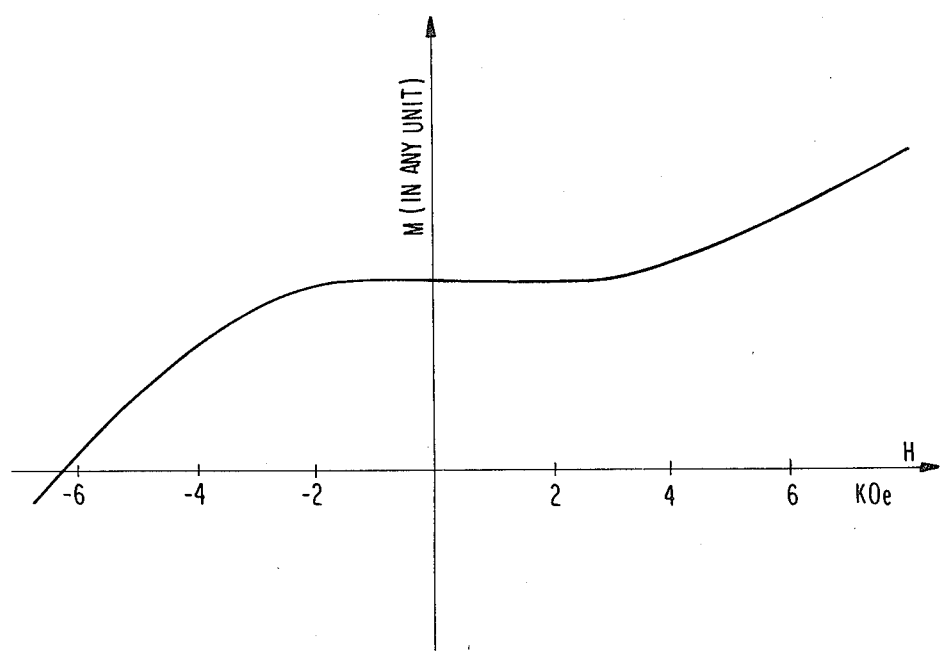

THIN MAGNETIC RECORDING MEDIUM

BACKGROUND OF THE INVENTION

This invention relates to a magnetic recording medium having a thin alloy film which has an axis of easy magnetization in a direction substantially vertical to the surface of the film and which is capable of recording information in high density by forming in the film a small reverse magnetic domain having a magnetic polarity opposite to the magnetic polarity of the film surface.

Three types of thin ferromagnetic films are known to have an axis of easy magnetization in a direction substantially vertical to the surface of the film and to have the ability to record information in high density by forming a small reverse magnetic domain upon exposure to light by virture of their Curie point or magnetic compensating temperature. The three types of thin ferromagnetic films include: (1) a thin film of polycrystalline metal typified by MnBi; (2) a thin film of an amorphous metal such as Gd-Co or Gd-Fe; and (3) a thin film of a single-crystal compound typified by GIG. However, these films are very difficult to produce, have a very small coercive force at room temperature or are very expensive.

A thin film of amorphous Tb-Fe or Dy-Fe has a high coercive force at room temperature, but according to Japanese Patent Application (OPI) No. 31703/77 (the term "OPI" as used herein means an unexamined published Japanese patent application), a thin amorphous film of Tb-Fe exhibits such property only when it contains 15 to 30 atomic% Tb, and, according to Japanese Patent Application (OPI) No. 109193/77, a thin amorphous film of Dy-Fe exhibits such desired property only when it contains 18 to 28 atomic% Dy.

SUMMARY OF THE INVENTION

The primary object of this invention is to provide a magnetic recording medium having a thin magnetic film for vertical magnetization which exhibits high coercive force over a wide compositional range.

BRIEF DESCRIPTION OF THE DRAWING

The FIGURE is a characteristic magnetization curve of a magnetic recording medium having a thin magnetic film prepared according to this invention.

DETAILED DESCRIPTION OF THE INVENTION

This invention provides a magnetic recording medium having a thin magnetic amorphous rare earth metal-transition metal alloy film that has an axis of easy magnetization in a direction substantially vertical to the film surface and which contains a crystalline phase in the amorphous phase.

For the purpose of this invention, the rare earth metal is exemplified by Gd, Tb and Dy and the transition metal is exemplified by Fe, Co and Ni. The crystalline phase is composed of an elemental rare earth metal as defined above and/or oxide thereof such as $Tb_4O_7$ and $Gd_2O_3$. The crystalline phase of elemental rare earth metal and/or oxide thereof prevents migration of magnetic domains in the thin amorphous alloy film to thereby provide a recording medium having high coercive force. The amorphous alloy film may contain several atomic% or less of impurities such as rare earth metals or transition metals other than those described above, Si, Cu, Mo, W and oxides thereof.

The term "amorphous" used therein means that X-ray diffractiometry does not show a diffraction line.

To provide the desired uniaxial magnetic anisotropy in a direction substantially vertical to the film surface, the thin magnetic film of this invention is preferably produced by sputtering. Other suitable means such as vacuum deposition may, of course, be used. Typical sputtering conditions are as follows: initial degree of vacuum = less than $4\times10^{-7}$ Torr; sputtering pressure = $3\times10^{-2}$ to $8\times10^{-2}$ Torr; pre-sputtering of a sputtering source material to clear the surface thereof = 300 to 600 W for 2 hours; sputtering voltage = 300 to 600 W; sputtering time = 15 to 45 minutes; substrate temperature (measured by a thermocouple embedded in a substrate holder) = 30° to 100° C.; and an argon atmosphere.

There are two preferred methods to form the desired crystalline phase in the thin amorphous alloy film;

1. In one method, a substrate on which a thin film of rare earth metal and transition metal is to be formed is held at a temperature slightly higher than the temperature at which the thin amorphous alloy film is formed.
2. According to the second method, an alloy film having an excess of rare earth metal is heat-treated (50° to 200° C. for several minutes under vacuum ($10^{-5}$ Torr of oxygen may be contained)) to provide crystals of that rare earth metal in the form of an element or oxide.

In either method, the formation of the desired crystalline phase can be facilitated with advantage by using, as a sputtering or vacuum-deposition source material (target), a rare earth metal-transition metal alloy containing a high amount (e.g., 30 atomic% or more) of the rare earth metal and/or a small amount (e.g., several atomic%) of a high-melting substance such as Mo or W.

The thin amorphous rare earth metal-transition metal film is formed on a substrate which has a good surface smoothness and low thermal conductivity, such as glass, silicon and polyethylene terephthalate. The thickness of the substrate is not limited and varies depending upon the end use. One or more rare earth metals may be combined with one or more transition metals to form the thin magnetic film of this invention, if desired. The thickness of the thin magnetic film is generally from about 300 Å to about $2\mu$, and preferably from 500 Å to $1\mu$.

According to this invention, a magnetic recording medium having a thin magnetic film which has high coercive force of more than 700 Oe, preferably more than 1 KOe, can be produced whichever rare earth metal is used. As a further advantage, the thin magnetic film of this invention exhibits high coercive force over a wide compositional range. For example, while an amorphous Tb-Fe alloy film as described in Japanese Patent Application (OPI) No. 31703/77 has a high coercive force only when Tb is contained in an amount of 15 to 30 atomic%, an amorphous Tb-Fe alloy film containing more than 30 atomic% Tb and having a high coercive force can be produced by forming a crystalline phase of elemental Tb and/or Tb oxide in the amorphous phase. The thin magnetic film of this invention has an axis of easy magnetization in a direction substantially vertical to the film surface and can from a small reverse magnetic domain having a diameter of $0.3-0.4\mu$ at the minimum, so it achieves recording of information at high memory density. The magnetic film has a high coercive force at room temperature and hence provides stable storage of recorded information. Another advantage resulting from the high coercive force is that a desired magnetic domain shape can be written into the magnetic film.

This invention will now described in greater detail by reference to the following example which is given herein for illustrative purposes only and is by no means intended to limit the scope of the invention.

EXAMPLE

A thin Tb-Fe alloy film having a thickness of about 4900 Å was formed from a target composed of Tb and Fe at a ratio of 1:1 on a silicon substrate in a conventional diode RF sputtering system with the substrate held at a temperature slightly higher than the temperature of water used for cooling the substrate in the production of a thin amorphous Tb-Fe alloy film. The sputtering conditions were as follows; initial degree of vacuum = less than $3 \times 10^{-7}$ Torr; argon pressure = $6 \times 10^{-4}$ Torr; sputtering pressure = $4 \times 10^{-2}$ Torr; sputtering voltage = 600 W.

The thin Tb-Fe alloy film obtained contained 43 atomic% Tb. X-ray diffractiometry showed the presence of rhombohedral Tb crystals.

As is shown in the magnetization curve of the FIGURE, the film had an adequate coercive force. It was also confirmed that thin Tb-Fe alloy films prepared according to this invention and which contained Tb in amounts of 36 atomic%, 58 atomic% and 70 atomic%, respectively, had a satisfactorily coercive force. From these data, it was concluded that the thin Tb-Fe alloy film of this invention has high coercive force even if it contains more than 30 atomic% Tb. The upper limit for the Tb content is such that the thin Tb-Fe alloy film obtained exhibits ferromagnetism at room temperature.

While the invention has been described in detail and with reference to specific embodiments thereof, it will be apparent to one skilled in the art that various changes and modifications can be made therein without departing from the spirit and scope thereof.

What is claimed is:

1. A magnetic recording medium having a thin magnetic amorphous rare earth metal-transition metal alloy film that has an axis of easy magnetization in a direction substantially vertical to the film surface and which contains a crystalline phase in the amorphous phase wherein said rare earth metal is selected from the group consisting of Gd, Tb and Dy and said transition metal is selected from the group consisting of Fe, Co and Ni and said crystalline phase is composed of an elemental rare earth metal and/or oxide thereof.

2. A magnetic recording medium of claim 1, wherein said crystalline phase is composed of elemental Gd, elemental Tb, elemental Dy, $Tb_4O_7$ or $Gd_2O_3$.

3. A magnetic recording medium of claim 1, wherein said amorphous alloy film is an amorphous Tb-Fe alloy film containing more than 30 atomic% Tb and containing in the amorphous phase of the film a crystalline phase of elemental Tb and/or Tb oxide.

4. A magnetic recording medium of claim 1, wherein said amorphous alloy film has a thickness of from about 300 Å to about $2\mu$.

5. A magnetic recording medium of claim 1, wherein said amorphous alloy film has a coercive force of more than 700 Oe.

6. A magnetic recording medium of claim 1, wherein said amorphous alloy film is capable of forming a reverse magnetic domain having a diameter of, at the minimum, 0.3 to $0.4\mu$ having a magnetic polarity opposite to the magnetic polarity of the film surface.

* * * * *